(12) United States Patent
Moon et al.

(10) Patent No.: US 12,316,580 B2
(45) Date of Patent: May 27, 2025

(54) METHOD AND APPARATUS FOR IN-BAND FULL-DUPLEX COMMUNICATION

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 419 days.

(21) Appl. No.: 17/830,036

(22) Filed: Jun. 1, 2022

(65) Prior Publication Data

US 2022/0393847 A1 Dec. 8, 2022

(30) Foreign Application Priority Data

Jun. 2, 2021 (KR) .................. 10-2021-0071642
May 26, 2022 (KR) .................. 10-2022-0064433

(51) Int. Cl.
*H04L 5/14* (2006.01)

(52) U.S. Cl.
CPC ..................... *H04L 5/14* (2013.01)

(58) Field of Classification Search
CPC ..... H04L 1/00; H04L 5/14; H04L 5/00; H04L 5/16; H04W 72/12; H04W 72/04; H04W 80/02

See application file for complete search history.

(56) References Cited

U.S. PATENT DOCUMENTS

| | | | | |
|---|---|---|---|---|
| 11,516,800 B2 * | 11/2022 | Ang | ..................... | H04L 5/001 |
| 11,622,351 B2 * | 4/2023 | Abotabl | ..................... | H04L 5/14 |
| | | | | 370/277 |
| 11,690,088 B2 * | 6/2023 | Fakoorian | ......... | H04W 72/0453 |
| | | | | 370/329 |
| 11,729,050 B2 * | 8/2023 | Abdelghaffar | ........ | H04L 5/0007 |
| | | | | 370/254 |
| 11,864,196 B2 * | 1/2024 | Li | ..................... | H04W 72/23 |
| 2019/0207738 A1 | 7/2019 | Son et al. | | |
| 2020/0213072 A1 | 7/2020 | Baek et al. | | |
| 2021/0058862 A1 | 2/2021 | Choo et al. | | |

(Continued)

FOREIGN PATENT DOCUMENTS

| | | |
|---|---|---|
| EP | 3340520 A1 | 6/2018 |
| KR | 10-2019-0067690 A | 6/2019 |
| WO | 2020/213877 A1 | 10/2020 |

*Primary Examiner* — Bailor C Hsu
(74) *Attorney, Agent, or Firm* — Rabin & Berdo, P.C.

(57) ABSTRACT

A method of a terminal may comprise: receiving, from a base station, configuration information of a guard band configured within a carrier bandwidth; determining a first transmission direction of a first subband configured in a higher frequency region from the guard band within the carrier bandwidth; determining a second transmission direction of a second subband configured in a lower frequency region from the guard band within the carrier bandwidth; determining a third transmission direction of the guard band based on the first transmission direction and the second transmission direction; and performing communication with the base station according to the third transmission direction in the guard band.

20 Claims, 11 Drawing Sheets

(56) References Cited

U.S. PATENT DOCUMENTS

| | | |
|---|---|---|
| 2021/0100038 A1 | 4/2021 | Ly et al. |
| 2021/0111858 A1 | 4/2021 | Choo et al. |
| 2021/0176626 A1 | 6/2021 | Abdelghaffar et al. |
| 2022/0007395 A1* | 1/2022 | Lei ........................ H04L 1/0003 |
| 2022/0014345 A1* | 1/2022 | Abdelghaffar .... H04W 72/0446 |
| 2022/0022209 A1* | 1/2022 | Abotabl ................ H04L 5/0005 |
| 2022/0086029 A1* | 3/2022 | Abotabl .............. H04L 27/2605 |
| 2022/0159659 A1* | 5/2022 | Hosseini ............... H04W 24/08 |
| 2024/0114509 A1* | 4/2024 | Gou ..................... H04L 5/0044 |

* cited by examiner

METHOD AND APPARATUS FOR IN-BAND FULL-DUPLEX COMMUNICATION

CROSS-REFERENCE TO RELATED APPLICATIONS

This application claims priority to Korean Patent Applications No. 10-2021-0071642 filed on Jun. 2, 2021, and No. 10-2022-0064433 filed on May 26, 2022 with the Korean Intellectual Property Office (KIPO), the entire contents of which are hereby incorporated by reference.

BACKGROUND

1. Technical Field

The present disclosure relates to techniques for transmitting and receiving signals in a communication system, and more particularly, to techniques for performing or supporting in-band full-duplex communications in a communication system.

2. Related Art

In order to construct an infrastructure for accelerating the growth of various future industries, a more advanced communication system (e.g., new radio (NR) communication system) than the conventional communication system (e.g., long-term evolution (LTE) communication system) is being considered. The NR communication system may support a frequency band of 6 GHz or above as well as a frequency band of 6 GHz or below, and may support various communication services and scenarios compared to the LTE communication system. For example, usage scenarios of the NR communication system may include enhanced Mobile BroadBand (eMBB), Ultra-Reliable Low-Latency Communication (URLLC), massive Machine Type Communication (mMTC), and the like. There is a need for communication technologies to satisfy the various requirements of the industries.

SUMMARY

Accordingly, exemplary embodiments of the present disclosure are directed to providing a method and an apparatus for performing or supporting in-band full-duplex communications in a communication system.

According to a first exemplary embodiment of the present disclosure, a method of a terminal may comprise: receiving, from a base station, configuration information of a guard band configured within a carrier bandwidth; determining a first transmission direction of a first subband configured in a higher frequency region from the guard band within the carrier bandwidth; determining a second transmission direction of a second subband configured in a lower frequency region from the guard band within the carrier bandwidth; determining a third transmission direction of the guard band based on the first transmission direction and the second transmission direction; and performing communication with the base station according to the third transmission direction in the guard band.

Each of the first transmission direction, the second transmission direction, and the third transmission direction may be downlink, uplink, or flexible, the first transmission direction, the second transmission direction, and the third transmission direction may be applied to a same time period, and the guard band may be regarded as a transmission resource used for the communication based on the first transmission direction and the second transmission direction.

When both the first transmission direction and the second transmission direction are downlink, the third transmission direction may be determined to be downlink, and the communication may be downlink communication.

When both the first transmission direction and the second transmission direction are uplink, the third transmission direction may be determined to be uplink, and the communication may be uplink communication.

When the first transmission direction is flexible, the third transmission direction may be determined to be same as the second transmission direction, and the communication may be performed with a same transmission direction in the second subband and the guard band.

The first transmission direction and the second transmission direction may be determined based on information included in a message received from the base station.

Each of the guard band, the first subband, and the second subband may include one or more continuous resource blocks (RBs).

The first transmission direction, the second transmission direction, and the third transmission direction may be applied to a first time period, a fourth transmission direction of the first subband and a fifth transmission direction of the second subband may be configured in a second time period different from the first time period, and the guard band may be regarded as a resource not used for the communication in the second time period based on the fourth transmission direction and the fifth transmission direction.

The fourth transmission direction may be uplink, and the fifth transmission direction may be downlink.

The fourth transmission direction may be flexible, and the fifth transmission direction may be one of downlink and uplink.

According to a second exemplary embodiment of the present disclosure, a method of a base station may comprise: transmitting, to a terminal, configuration information of a guard band configured within a carrier bandwidth; determining a first transmission direction of a first subband configured in an upper frequency region from the guard band within the carrier bandwidth; determining a second transmission direction of a second subband configured in a lower frequency region from the guard band within the carrier bandwidth; determining a third transmission direction of the guard band based on the first transmission direction and the second transmission direction; and performing communication with the terminal according to the third transmission direction in the guard band.

Each of the first transmission direction, the second transmission direction, and the third transmission direction may be downlink, uplink, or flexible, the first transmission direction, the second transmission direction, and the third transmission direction may be applied to a same time period, and the guard band may be regarded as a transmission resource used for the communication based on the first transmission direction and the second transmission direction.

When both the first transmission direction and the second transmission direction are downlink, the third transmission direction may be determined to be downlink, and the communication may be downlink communication.

When both the first transmission direction and the second transmission direction are uplink, the third transmission direction may be determined to be uplink, and the communication may be uplink communication.

When the first transmission direction is flexible, the third transmission direction may be determined to be same as the second transmission direction, and the communication may be performed with a same transmission direction in the second subband and the guard band.

The method may further comprise transmitting, to the terminal, a message including information for determining the first transmission direction and the second transmission direction, wherein the first transmission direction and the second transmission direction may be determined based on the information included in the message.

Each of the guard band, the first subband, and the second subband may include one or more continuous resource blocks (RBs).

The first transmission direction, the second transmission direction, and the third transmission direction may be applied to a first time period, a fourth transmission direction of the first subband and a fifth transmission direction of the second subband may be configured in a second time period different from the first time period, and the guard band may be regarded as a resource not used for the communication in the second time period based on the fourth transmission direction and the fifth transmission direction.

The fourth transmission direction may be uplink, and the fifth transmission direction may be downlink.

The fourth transmission direction may be flexible, and the fifth transmission direction may be one of downlink and uplink.

According to the present disclosure, a transmission direction of a guard band may be determined based on transmission directions of adjacent subbands. When the transmission direction of the guard band is determined to be downlink, downlink communication may be performed in the guard band. When the transmission direction of the guard band is determined to be uplink, uplink communication may be performed in the guard band. Since the guard band is used as a transmission resource, the efficiency of resource use can be improved, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

DETAILED DESCRIPTION OF THE EMBODIMENTS

Figure 1:
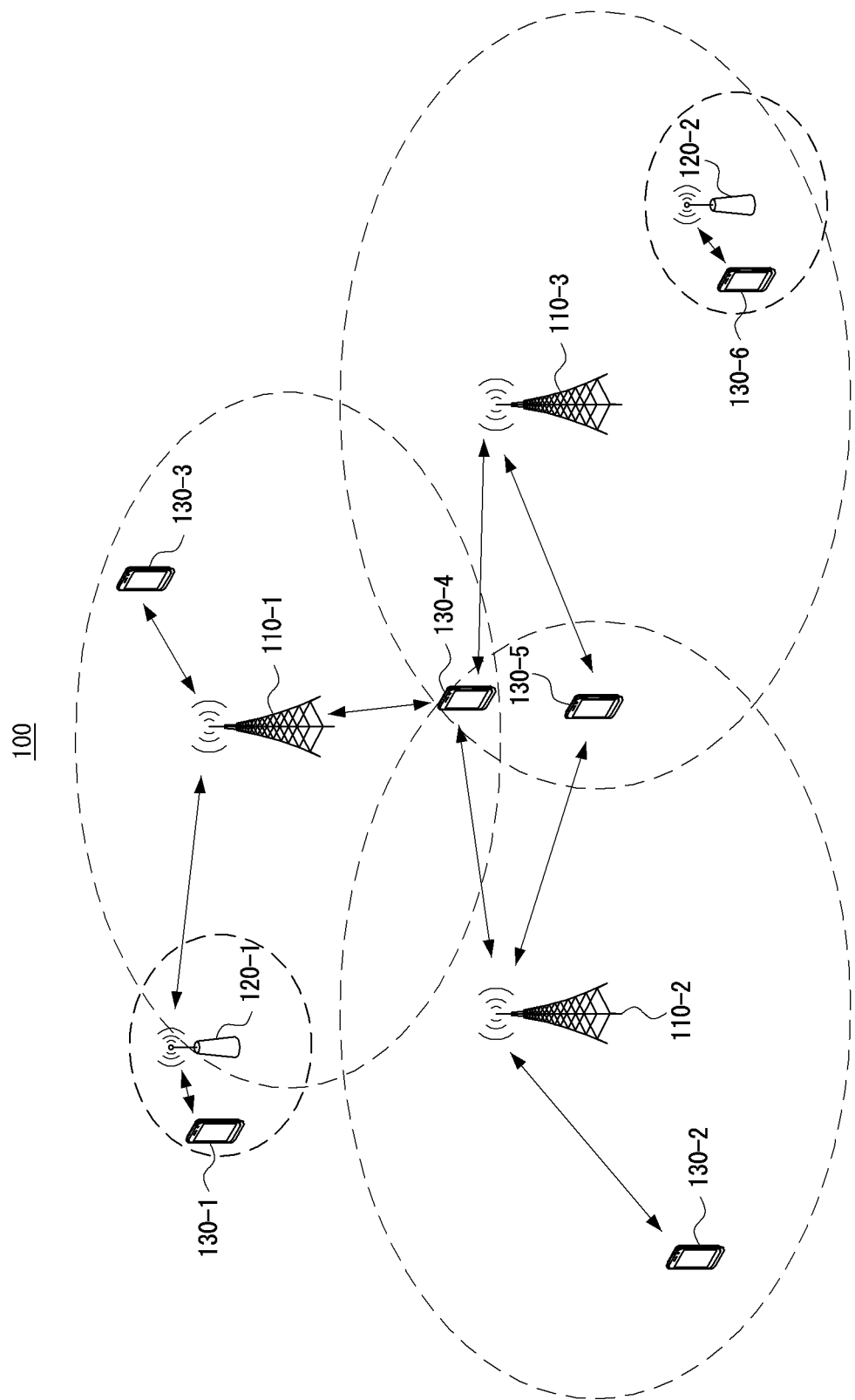
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
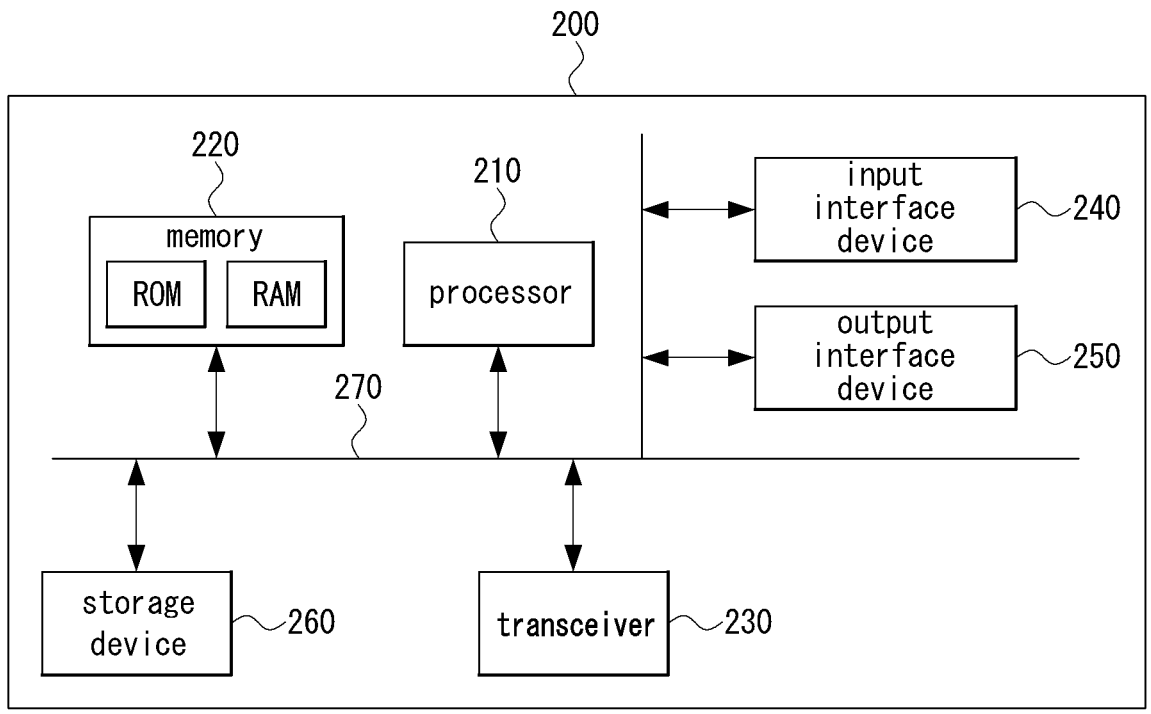
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Methods for transmitting and receiving signals in a communication system will be described. In particular, methods for in-band full-duplex communication in a communication system will be described. The exemplary embodiments below may be applied not only to the NR communication system but also to other communication systems (e.g., LTE communication system, 5G communication system, 6G communication system, or the like).

A numerology applied to physical signals and channels in the communication system (e.g., NR communication system or 6G communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

TABLE 1

| Subcarrier spacing | 15 kHz | 30 kHz | 60 kHz | 120 kHz | 240 kHz | 480 kHz |
|---|---|---|---|---|---|---|
| OFDM symbol length [μs] | 66.7 | 33.3 | 16.7 | 8.3 | 4.2 | 2.1 |
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARQ) timing, channel state information (CSI) measurement and reporting timing, etc.), and the like. The length of an actual time resource used for transmission, measurement, scheduling, resource configuration, etc. may not match the length of a slot. A mini-slot may include consecutive symbol(s), and the length of a mini-slot may be shorter than the length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., the length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the periodic operation configured by the base station may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The base station and the terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB). The IRB will be described later.

A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information or a master information block (MIB) transmitted on the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. The terminal may monitor PDCCH candidate(s) for the CORESET configured in the downlink active bandwidth part. Alternatively, the terminal may monitor PDCCH candidate(s) for a CORESET (e.g., CORESET #0) configured in a downlink bandwidth part other than the downlink active bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH. The terminal may periodically monitor the search space, and may monitor the search space at one or more time positions (e.g., PDCCH monitoring occasions, CORESET) within one period.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with one CORESET. One CORESET may be logically associated with one or more search space sets. A search space set for transmitting a common DCI or a group common DCI may be referred to as a common search space set (hereinafter, referred to as a 'CSS set'). The common DCI or the group common DCI may include at least one of resource allocation information of a PDSCH for transmission of system information, paging, a power control command, SFI, or a pre-emption indicator. In the case of the NR communication system, the common DCI may correspond to DCI formats 0_0, 1_0, etc., and a cyclic redundancy check (CRC) of the common DCI may be scrambled by a system information-radio network temporary identifier (SI-RNTI), paging-RNTI (P-RNTI), random access-RNTI (RA-RNTI), temporary cell-RNTI (TC-RNTI), or the like. The group common DCI may correspond to a DCI format 2_X (X=0, 1, 2, . . . ), or the like, and a CRC of the group common DCI may be scrambled by a slot format indicator-RNTI (SFI-RNTI) or the like. The CSS set may include Type 0, Type 0A, Type 1, Type 2, and Type 3 CSS sets.

A search space set for transmitting a UE-specific DCI may be referred to as a UE-specific search space set (hereinafter, referred to as a 'USS set'). The UE-specific DCI may include scheduling and resource allocation information for a PDSCH, PUSCH, PSSCH, or the like. In the case of the NR communication system, the UE-specific DCI may correspond to DCI formats 0_1, 0_2, 1_1, 1_2, 3_0, 3_1, or the like, and a CRC of the UE-specific DCI may be scrambled by a C-RNTI, configured scheduling-RNTI (CS-RNTI), modulation and coding scheme-C-RNTI (MCS-C-RNTI), or the like. In consideration of scheduling freedom or fallback transmission, a UE-specific DCI may be transmitted even in a CSS set. In this case, the UE-specific DCI may be transmitted according to the DCI format corresponding to the common DCI. For example, the terminal may monitor a PDCCH (e.g., DCI formats 0_0, 0_1) whose CRC is scrambled with a C-RNTI, CS-RNTI, MCS-C-RNTI, or the like in the CSS set.

The Type 0 CSS set may be used for receiving a DCI scheduling a PDSCH including an SIB1, and may be configured through a PBCH or cell-specific RRC signaling. The ID of the Type 0 CSS set may be assigned as or set to 0. The type 0 CSS set may be logically combined with the CORESET #0.

The terminal may assume that a PDCCH DM-RS has a QCL relationship with a certain signal (e.g., SS/PBCH block, CSI-RS, PDSCH DM-RS, PDCCH DM-RS, or the like). In addition, since a PDCCH has the same antenna port as a corresponding PDCCH DM-RS, the PDCCH and the PDCCH DM-RS may have a QCL relationship with each other. Therefore, the terminal may acquire information on large-scale propagation characteristics of a radio channel experienced by the PDCCH and the PDCCH DM-RS through the QCL assumption, and may utilize the information on the large-scale propagation characteristics for channel estimation, reception beamforming, and the like. A QCL parameter may include at least one of a delay spread, Doppler spread, Doppler shift, average gain, average delay, or spatial Rx parameter. The spatial Rx parameter may correspond to at least one characteristic of a reception beam, reception channel spatial correlation, or transmission/reception beam pair. For convenience, the spatial Rx parameter may be referred to as 'spatial QCL'. The PDCCH may be used in a sense including the PDCCH DM-RS, and an expression that the PDCCH has a QCL relationship with a certain signal may include the meaning that the PDCCH DM-RS of the PDCCH has a QCL relationship with the certain signal. A signal having a QCL relationship with the PDCCH or a resource thereof may be referred to as a QCL source, QCL source signal, QCL source resource, or the like.

PDCCHs transmitted in the same CORESET (and a search space set, PDCCH monitoring occasions, etc. corresponding thereto) may have the same QCL relationship. That is, a unit of a set for which the terminal assumes the same QCL may be a CORESET, and the QCL assumption for each of the CORESETs may be independent. In an exemplary embodiment, a QCL, QCL source, etc. of a certain CORESET may mean a QCL, QCL source, etc. of a PDCCH received through the corresponding CORESET, respectively. Exceptionally, different QCL assumptions may be applied to search space sets corresponding to one CORESET. For example, a search space set for monitoring an RA-RNTI (e.g., Type 1 CSS set) and other search space sets may have different QCL relationships.

A QCL relationship or QCL assumption (e.g., QCL source, QCL type, etc.) of a CORESET may be determined by a predefined method. For example, the terminal may assume that a PDCCH DM-RS received through a certain CORESET or a certain search space set has a QCL relationship, with respect to a predefined QCL type, with an SS/PBCH block and/or CSI-RS selected in an initial access or random access procedure. Here, the QCL type may mean a set of one or more QCL parameter(s). Alternatively, a QCL relationship or QCL assumption (e.g., QCL source, QCL type, etc.) of a CORESET may be signaled from the base station to the terminal (e.g., through RRC signaling, medium access control (MAC) control element (CE) signaling, DCI signaling, or a combination thereof). That is, the base station may configure a transmission configuration information (TCI) state for a CORESET to the terminal. In general, the TCI state may include an ID of a signal (e.g., a QCL source or QCL source resource of a PDCCH DM-RS) having a QCL relationship with a DM-RS (e.g., the PDCCH DM-RS) of a physical channel to which the TCI is applied, and/or at least one QCL type thereof. For example, the base station may configure one or more TCI state candidates for each CORESET to the terminal through RRC signaling, and may indicate or configure one TCI state to be used for CORESET monitoring of the terminal from among the one or more TCI state candidates to the terminal through MAC signaling (or DCI signaling). When there is one TCI state candidate configured by RRC signaling, the MAC signaling procedure (or DCI signaling procedure) may be omitted. The terminal may perform PDCCH monitoring and reception operations for the corresponding CORESET based on the TCI state configuration information received from the base station.

Meanwhile, duplex communication between communication nodes (e.g., a base station and a terminal) may be performed based on a half-duplex scheme or a full-duplex scheme. According to the half-duplex scheme, a communication node may be able to perform only one of an operation of transmitting a signal and an operation of receiving a signal at one point in time. In other words, the communication node may not simultaneously perform a transmission operation and a reception operation. According to the full-duplex scheme, a communication node may perform a transmission operation and a reception operation at the same time or at different times.

In a frequency division duplex (FDD) system (e.g., a system using an FDD carrier, a paired spectrum, etc.), full-duplex communication may be easily performed. A communication node may perform a transmission operation and a reception operation in separated frequency regions (e.g., an uplink carrier and a downlink carrier), respectively. In this case, interferences between a transmission signal and a reception signal may be very small. On the other hand, in a time division duplex (TDD) system (e.g., a system using a TDD carrier, an unpaired spectrum, etc.), a communication node may perform a transmission operation and a reception operation within a common frequency region (e.g., a carrier commonly used for uplink and downlink transmissions). When the transmission operation and the reception operation are performed at the same time, the transmission signal may act as interferences to the reception signal. Therefore, in order to perform full-duplex communication in the TDD system, a self-interference cancellation technique may be required. In the TDD system, full-duplex communication may be referred to as 'in-band full-duplex communication'. On the other hand, half-duplex communication can be easily performed in the FDD system and the TDD system because there is no interference problem described above.

Figure 3:
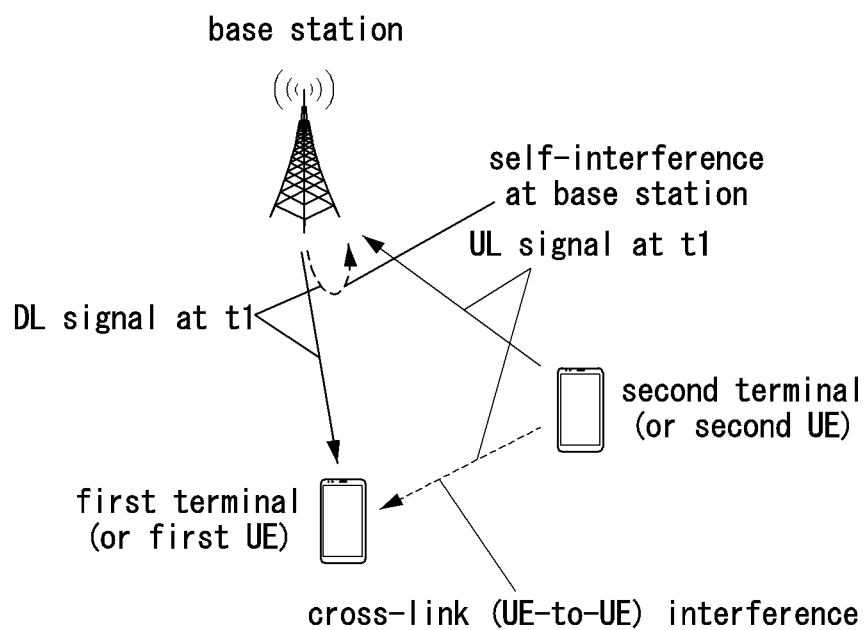
FIG. 3 is a conceptual diagram illustrating a first exemplary embodiment of an in-band full-duplex communication method.

FIG. 3 is a conceptual diagram illustrating a first exemplary embodiment of an in-band full-duplex communication method.

Referring to FIG. 3, a base station may perform duplex communication with terminal(s) based on the full-duplex scheme. That is, the base station may perform a transmission operation and a reception operation at the same time (e.g., at the same time point). On the other hand, the terminal may perform only one of a transmission operation and a reception operation at one time. For example, the base station may transmit a downlink signal to a first terminal at a time t1, and may receive an uplink signal from a second terminal at the time t1 simultaneously with the transmission operation of the downlink signal. The downlink signal and uplink signal may be transmitted in the same band (e.g., within the same carrier). In this case, the downlink signal may act as self-interference when the base station receives the uplink signal. The base station may improve the reception performance of the uplink signal by eliminating or mitigating self-interference in advance before detecting the uplink signal from the reception signal.

In addition, the uplink signal transmitted by the second terminal may act as interference when the first terminal receives the downlink signal. Interference between an uplink signal and a downlink signal (e.g., an uplink signal and a downlink signal transmitted from different communication nodes (i.e., devices)) may be referred to as 'cross-link interference'. The strength of the cross-link interference of the uplink signal on the downlink signal may be large when a distance between the first terminal and the second terminal is close or when a transmission beam direction of the uplink signal from the second terminal is similar to a direction of the first terminal. Therefore, the reception performance of the downlink signal at the first terminal may be deteriorated. In particular, if the first terminal does not have the ability to eliminate cross-link interference, the deterioration of reception performance may be more serious.

In order to solve the above-described interference problem between terminals, an uplink signal and a downlink signal in the in-band full-duplex communication may be transmitted in different resource regions (e.g., time-frequency resource regions). For example, an uplink signal and a downlink signal transmitted in the same band (e.g., the same carrier) may be transmitted in different time resource regions. Alternatively, the uplink signal and downlink signal transmitted in the same band (e.g., the same carrier) may be transmitted simultaneously (e.g., at the same time), and in this case, the uplink signal and the downlink signal may be transmitted in different frequency regions.

Figure 4:
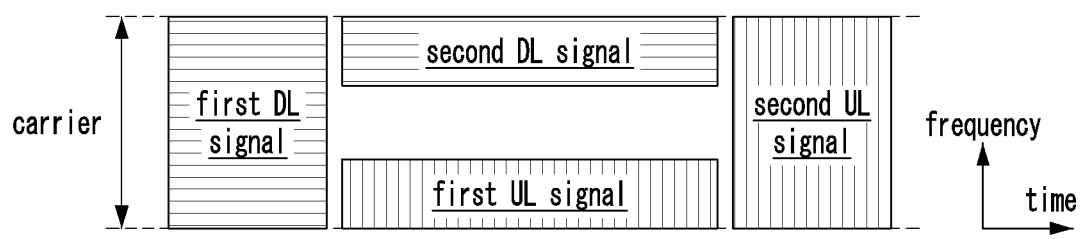
FIG. 4 is a conceptual diagram illustrating a first exemplary embodiment of a method for multiplexing an uplink signal and a downlink signal in full-duplex communication.

FIG. 4 is a conceptual diagram illustrating a first exemplary embodiment of a method for multiplexing an uplink signal and a downlink signal in full-duplex communication.

Referring to FIG. 4, uplink signals and downlink signals in one serving cell (or carrier) may be multiplexed and transmitted in different resources (e.g., time-frequency resources). The uplink signal may be referred to as a UL signal, and the downlink signal may be referred to as a DL signal. For example, a first downlink signal, a second downlink signal (or a first uplink signal), and a second uplink signal may be transmitted in different time resources. That is, the first downlink signal, the second downlink signal (or the first uplink signal), and the second uplink signal may be transmitted in a time division multiplexing (TDM) scheme. As another example, the first uplink signal and the second downlink signal may be transmitted in the same time resource and different frequency resources. That is, the first uplink signal and the second downlink signal may be transmitted in a frequency division multiplexing (FDM) scheme.

The base station may transmit and receive uplink signals and downlink signals. For example, the base station may transmit the second downlink signal to the terminal (e.g., first terminal), and at the same time, may receive the first uplink signal from another terminal (e.g., second terminal). In this case, the second downlink signal may act as self-interference (or cross-link interference) at the time when the base station receives the first uplink signal. In addition, the first uplink signal may act as a cross-link interference when the first terminal receives the second downlink signal. However, according to the present exemplary embodiment, a frequency region in which the first uplink signal is transmitted and a frequency region in which the second downlink signal is transmitted may be separated from each other, and if the frequency regions are sufficiently far away, the interference described above may be mitigated. Here, the first and second terminals may be identical to the first and second terminals in the first exemplary embodiment of FIG. 3, respectively.

In exemplary embodiments below, methods for performing the above-described in-band full-duplex communication and signaling methods of control information therefor will be described. In exemplary embodiments below, single-carrier transmission will be mainly considered, but proposed methods are not limited to single-carrier transmission and may be easily applied to transmission in which carrier aggregation is used. In exemplary embodiments below, uplink transmission and downlink transmission may be performed in the same bandwidth part (BWP) or in different BWPs (e.g., an uplink BWP and a downlink BWP), even if not otherwise stated. The BWP(s) may be BWP(s) configured for the same serving cell or the same carrier. In addition, the TDD system will be considered mainly in exemplary embodiments, but the proposed methods may be easily applied to other systems (e.g., FDD systems).

[Methods for Full-duplex Resource Region Configuration]

Methods in which a base station configures resource region(s) for uplink transmission and downlink transmission to a terminal for full-duplex communication will be described. Here, the uplink transmission may refer to transmission of an uplink physical signal and/or channel. For example, the uplink transmission may include transmission of at least one of a PUSCH, PUCCH, DM-RS, SRS, PRACH, phase tracking-reference signal (PT-RS), or a combination thereof. The downlink transmission may refer to transmission of a downlink physical signal and/or channel. For example, the downlink transmission may include transmission of a PDSCH, PDCCH, DM-RS, CSI-RS, tracking reference signal (TRS), PT-RS, positioning reference signal (PRS), synchronization signals (e.g., primary synchronization signal (PSS) and/or secondary synchronization signal (SSS)), PBCH, SS/PBCH block, discovery signal, or a combination thereof.

The base station may configure (or indicate) one or more resource regions for signal transmission to the terminal. That is, the terminal may receive configuration information of the one or more resource regions for signal transmission from the base station. A certain resource region may be used for downlink transmission, and the resource region used for downlink transmission may be referred to as 'downlink resource region (e.g., DL resource region)', 'downlinking region (e.g., DL region)', or 'downlink resource (e.g., DL resource)'. A certain resource region may be used for uplink transmission, and the resource region used for uplink transmission may be referred to as 'uplink resource region (e.g., UL resource region)', 'uplink region (e.g., UL region)', or 'uplink resource (e.g., UL resource)'. A certain resource region may be used for downlink transmission and uplink transmission, and the resource region used for downlink transmission and uplink transmission may be referred to as 'flexible resource region (e.g., FL resource region)' or 'flexible resource (e.g., FL resource)'. Each resource region may be configured with a time resource and/or a frequency resource. For example, each resource region may be configured as an intersection between a time period (e.g., a set of slots (s), a set of symbols (s)) and a frequency region (e.g., a set of RB(s), a set of subcarrier(s)). Each resource region may include a continuous time period (e.g., a set of continuous slot(s), a set of continuous symbol(s)) and a continuous frequency region (e.g., a set of continuous RB(s), a set of continuous subcarrier(s)). The resource region(s) may be configured for each carrier. Alternatively, the resource region(s) may be configured for each BWP. The resource region(s) may belong to a carrier bandwidth or a bandwidth within a BWP.

Figure 5:
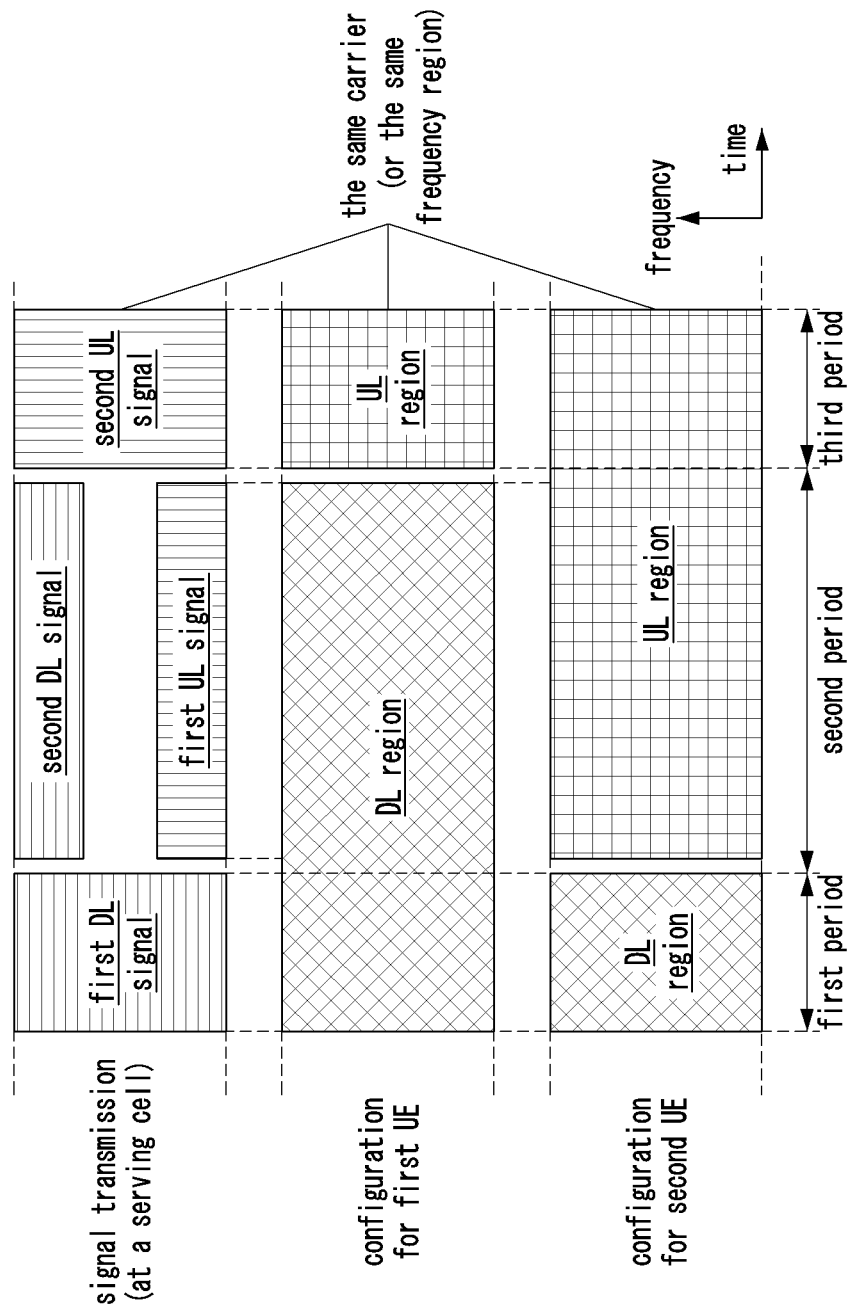
FIG. 5 is a conceptual diagram illustrating a first exemplary embodiment of a method for configuring a resource region for uplink transmission and downlink transmission to a terminal.
Figure 6:
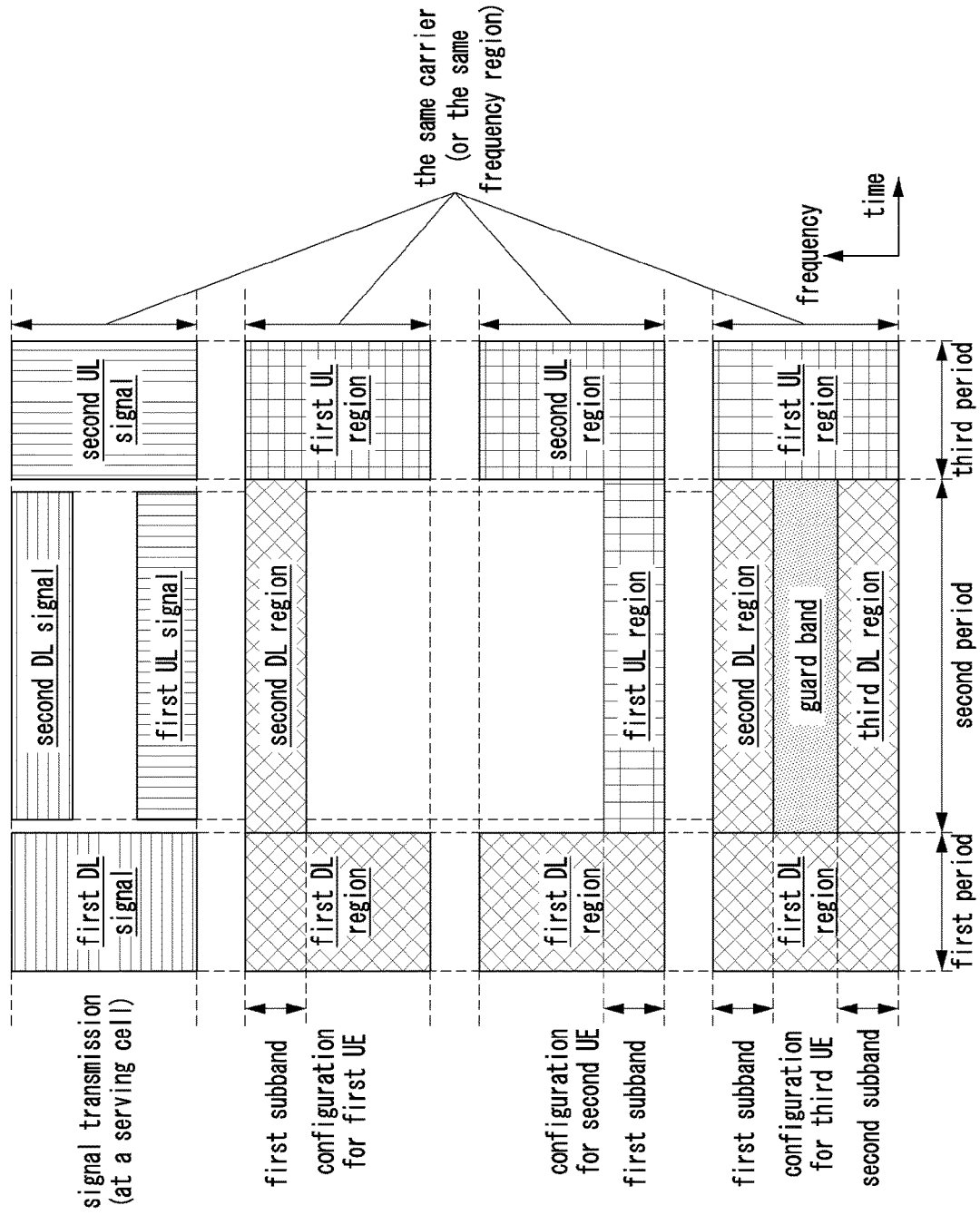
FIG. 6 is a conceptual diagram illustrating a second exemplary embodiment of a method for configuring a resource region for uplink transmission and downlink transmission to a terminal.
Figure 7:
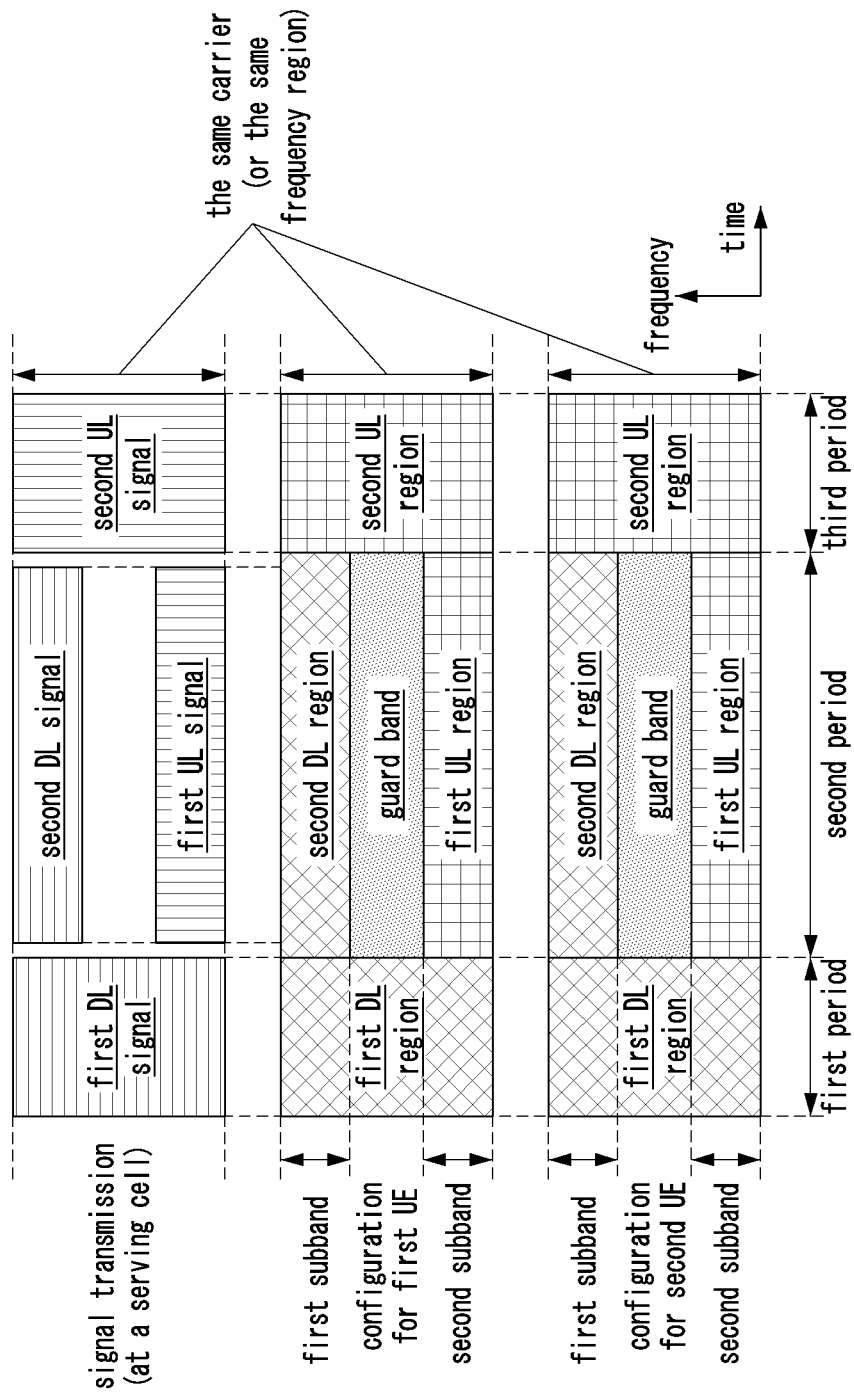
FIG. 7 is a conceptual diagram illustrating a third exemplary embodiment of a method for configuring a resource region for uplink transmission and downlink transmission to a terminal.

FIG. 5 is a conceptual diagram illustrating a first exemplary embodiment of a method for configuring a resource region for uplink transmission and downlink transmission to a terminal, FIG. 6 is a conceptual diagram illustrating a second exemplary embodiment of a method for configuring a resource region for uplink transmission and downlink transmission to a terminal, and FIG. 7 is a conceptual diagram illustrating a third exemplary embodiment of a method for configuring a resource region for uplink transmission and downlink transmission to a terminal.

Referring to FIGS. 5 to 7, similarly to the first exemplary embodiment of FIG. 4, uplink signals and downlink signals in one serving cell (or carrier) may be transmitted as being multiplexed in the TDM scheme or FDM scheme. The base station may perform a reception operation of the uplink signals and a transmission operation of the downlink signals. For example, the base station may transmit a second downlink signal to a terminal (e.g., first terminal), and receive a first uplink signal from another terminal (e.g., second terminal) at the same time as the transmission of the second downlink signal. The base station may configure (or indicate) a resource region for uplink and downlink transmissions to the terminal (e.g., first terminal and/or second terminal). The terminal (e.g., first terminal and/or second terminal) may receive configuration information of the resource region for uplink and downlink transmissions from the base station. Here, the first and second terminals may be identical to the first terminal and the second terminal in the exemplary embodiment of FIG. 3, respectively.

According to the first exemplary embodiment of FIG. 5, each resource region may include a predetermined time period in the time domain, and may include the entire bandwidth (e.g., all RB(s)) occupied by the entire band (e.g., carrier(s) (or BWP(s)) to which the resource region belongs in the frequency domain. The base station may configure (or indicate) a downlink period, an uplink period, and/or a flexible period to the terminal. The terminal may receive configuration information of the downlink period, the uplink period, and/or the flexible period from the base station. A transmission direction (e.g., downlink, uplink, flexible, or the like) configured to each period may be applied to the entire band of the corresponding period. This configuration may be performed based on the above-described slot format configuration (or indication) method.

Referring to FIG. 5, for the same or overlapping frequency region (e.g., carrier or BWP), the base station may configure (or indicate) a downlink period (or downlink region) and an uplink period (or uplink region) to each of the first and second terminals. Each of the first and second terminals may receive configuration information of the downlink period (or downlink region) and the uplink period (or uplink region) from the base station. The downlink periods and uplink periods configured to the terminals may be different. That is, the downlink period and/or the uplink period configured to the first terminal may be different from the downlink period and/or the uplink period configured to the second terminal. For example, a first period and a second period may be configured as a downlink period for the first terminal, and a third period may be configured as an uplink period for the first terminal. On the other hand, the first period may be configured as a downlink period for the second terminal, and the second period and the third period may be configured as an uplink period for the second terminal. The first terminal may receive a first downlink signal and/or a second downlink signal from the base station in the configured downlink period. The second terminal may transmit a first uplink signal and/or a second uplink signal to the base station in the configured uplink period. In this case, in the second period, the first terminal may receive the second downlink signal from the base station, and the second terminal may transmit the first uplink signal to the base station. That is, the second downlink signal and the first uplink signal may be transmitted simultaneously.

According to the second exemplary embodiment of FIG. 6, each resource region may include a predetermined time period in the time domain, and may include the entire band or a partial band (e.g., subband) in the frequency domain. For example, each resource region may include all or part (e.g., all RB(s) or some RB(s)) of a bandwidth occupied by a carrier(s) (or BWP(s)) to which itself belongs.

In this case, each period may correspond to one transmission direction and one resource region. For example, a first period, a second period, and a third period may be configured (or indicated) to a first terminal as a first downlink region, a second downlink region, and a first uplink region, respectively. The first period, the second period, and the third period may be configured (or indicated) to a second terminal as a first downlink region, a first uplink region, and a second uplink region, respectively. The same period may be configured to terminals as the same resource region or different resource regions. Each resource region may occupy all or a part of a reference frequency region (e.g., a bandwidth of a carrier(s) and a bandwidth of a BWP(s)). For example, the first downlink region and the first uplink region configured to the first terminal and the first downlink region and the second uplink region configured to the second terminal may occupy the entire carrier bandwidth (e.g., all RB(s) constituting the carrier). On the other hand, the second downlink region configured to the first terminal and the first uplink region configured to the second terminal may occupy a portion of the carrier bandwidth (e.g., some RB(s) constituting the carrier). In this case, the terminal may regard a frequency region that is not configured as the resource region as a guard band. For example, the first terminal may regard a frequency region outside the second downlink region in the second period as a guard band. Operations of the terminal with respect to the guard band will be described later. The method described above may be referred to as (Method 100).

Alternatively, each period may correspond to one or more resource region(s) having the same transmission direction.

For example, each of the first and third periods may be configured as one resource region (e.g., first downlink region and first uplink region) to the third terminal, and the second period may be configured as a plurality of resource regions (e.g., second downlink region and third downlink region) having the same transmission direction to the third terminal. The plurality of resource regions (e.g., second downlink region and third downlink region) may not be overlapped with each other. A guard band may be disposed between the plurality of resource regions in the same period (e.g., between the second downlink region and the third downlink region). The method described above may be referred to as (Method 110).

According to the third exemplary embodiment of FIG. 7, each resource region may include a predetermined time period in the time domain, and may include the entire band or a partial band (e.g., subband) in the frequency domain. For example, each resource region may include all or part (e.g., all RB(s) or some RB(s)) of a bandwidth occupied by a carrier(s) (or BWP(s)) to which itself belongs.

In this case, each period may correspond to one or more resource regions(s), and in the same period, resource region(s) may have the same transmission or different transmission directions. For example, one resource region (e.g., the first downlink region or the second uplink region) may be configured to the first terminal and the second terminal in each of the first and third periods. In the second period, a plurality of resource regions (e.g., second downlink region and first uplink region) having different transmission directions may be configured to the first and second terminals. The second downlink region and the first uplink region may not be overlapped with each other. In addition, a guard band may be disposed between the plurality of resource regions (e.g., between the second downlink region and the first uplink region) in the same period (or at the same time point). The method described above may be referred to as (Method 120).

In the exemplary embodiments, the terminal may determine a transmission direction, a time resource, and/or a frequency resource of each resource region based on configuration information received from the base station. The above-described configuration information may be transmitted to the terminal from the base station through a signaling procedure (e.g., RRC signaling, MAC CE signaling, DCI, and/or the like). The time resource in each resource region may be a set of slot(s) and/or symbol(s). Specifically, the time resource may be continuous slot(s) and/or symbol(s) having the same transmission direction. The frequency resource in each resource region may be a set of RB(s) and/or subcarrier(s). Specifically, the frequency resource may be a set of continuous RB(s) or a set of continuous subcarrier(s) having the same transmission direction. A frequency-domain configuration unit of each resource region may be one RB or a predefined continuous number of RB(s). Alternatively, the frequency-domain configuration unit of each resource region may be a subband. A subband may be a set of continuous RB(s). A subband may be referred to as an RB set. An RB may be a CRB, PRB, or VRB. In the case of un-licensed band communication, a subband may correspond to a frequency-domain unit in which a communication node performs a Listen-Before-Talk (LBT) procedure.

At the same time or separately, a subband may correspond to a BWP. For example, the subband may be a set of continuous RB(s) constituting the BWP. Different subbands may belong to different BWPs. In an exemplary embodiment, the terminal may be configured with multiple BWPs each consisting of at least one subband within a carrier. A subband that is configured as a downlink region may correspond to a downlink BWP, and a subband that is configured as an uplink region may correspond to an uplink BWP. A guard band may be configured between two configured BWPs. Referring to FIG. 7, the first subband and the second subband may correspond to a first BWP and a second BWP, respectively, and the guard band may be located between the first BWP and the second BWP. The first BWP and the second BWP may not overlap with each other.

In another exemplary embodiment, the terminal may be configured with multiple BWPs that are overlapping with each other in a frequency domain within a carrier. Referring to FIG. 7 again, the first BWP may include the first subband and the second subband (as well as the guard band), and the second BWP may include the second subband. In the second period, the first BWP may be configured as downlink and the second BWP may be configured as uplink, and they may overlap in the second subband. In other words, an uplink BWP may partially override a downlink BWP, and as a result, a downlink region and an uplink region may coexist in the same time period. If two transmission directions (e.g., downlink and uplink transmissions) collide in a same resource region, the terminal may treat that one of the transmission directions (e.g., uplink transmission) has a higher priority. According to this principle, the terminal may determine the second subband in the second period as the uplink region and may expect to be scheduled with the uplink transmission in the second subband in the second period.

Figure 8A:
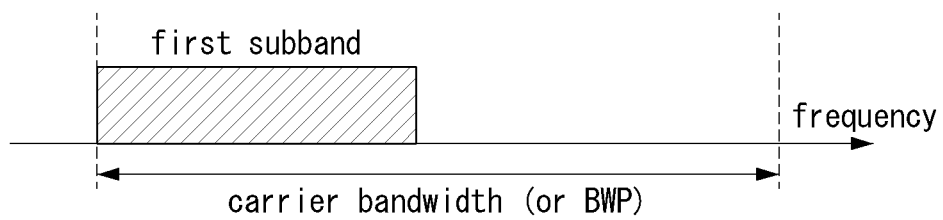
FIG. 8A is a conceptual diagram illustrating a first exemplary embodiment of a method for configuring a subband and/or a guard band.
Figure 8B:
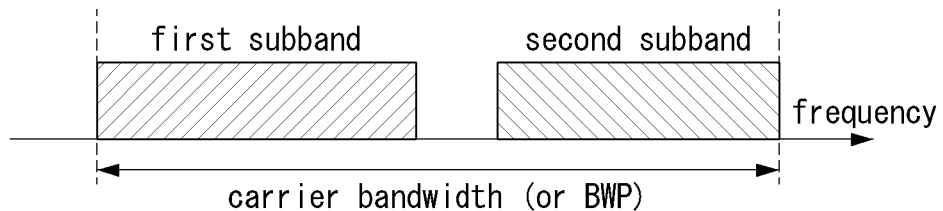
FIG. 8B is a conceptual diagram illustrating a second exemplary embodiment of a method for configuring a subband and/or a guard band.
Figure 8C:
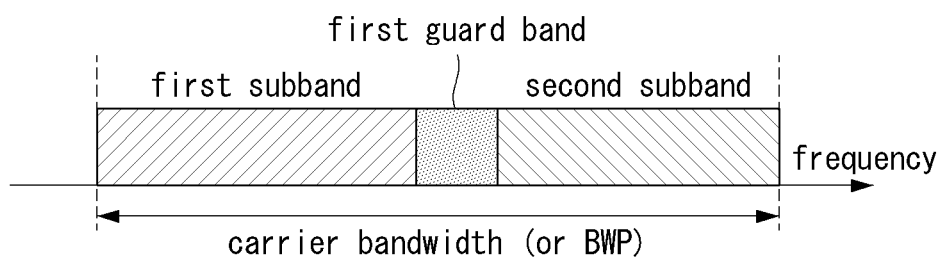
FIG. 8C is a conceptual diagram illustrating a third exemplary embodiment of a method for configuring a subband and/or a guard band.

FIG. 8A is a conceptual diagram illustrating a first exemplary embodiment of a method for configuring a subband and/or a guard band, FIG. 8B is a conceptual diagram illustrating a second exemplary embodiment of a method for configuring a subband and/or a guard band, and FIG. 8C is a conceptual diagram illustrating a third exemplary embodiment of a method for configuring a subband and/or a guard band.

Referring to FIGS. 8A to 8C, a base station may configure (or indicate) one or more subband(s) to a terminal. That is, the terminal may receive configuration information of the one or more subband(s) from the base station. The subband(s) may be configured within a carrier bandwidth (or BWP). The base station may configure (or indicate) information on a set of RB(s) constituting each subband to the terminal. That is, the terminal may receive information on a set of RB(s) constituting each subband from the base station. For example, the terminal may receive information on a start RB and an end RB of each subband. For example, the terminal may receive information on a start RB and the number of continuous RB(s) of each subband.

Referring to FIG. 8A, one subband may be configured to the terminal. In the same or similar manner as the exemplary embodiment of FIG. 8A, one subband in the exemplary embodiment of FIG. 6 may be configured to the first and second terminals. For example, a first subband may be configured to the first terminal, and the second downlink region including the first subband (or corresponding to the first subband) may be configured to the first terminal within the second period. The first subband may be configured to the second terminal, and the first uplink region including the first subband (or corresponding to the first subband) may be configured to the second terminal within the second period.

Referring to FIG. 8B, one or more (e.g., two) subband(s) may be configured to the terminal. In the same or similar manner as the exemplary embodiment of FIG. 8B, a plurality of (e.g., two) subbands in the second exemplary embodiment of FIG. 6 may be configured to the third terminal. For example, the first subband and the second subband may be configured to the third terminal, and the second downlink region including the first subband within the second period and the third downlink region including the second subband within the second period may be configured to the third terminal.

Referring to FIG. 8C, one or more (e.g., two) subband(s) may be configured to the terminal. A frequency gap may exist between the subbands, and the terminal may regard the frequency gap as a guard band. Each guard band may be composed of contiguous RB(s). A frequency range (e.g., a set of RB(s)) of the guard band may be determined by a frequency range of subbands adjacent to the guard band. When the number of configured subband(s) is N, (N−1) guard band(s) may be determined. N may be a natural number. In the exemplary embodiment of FIG. 8C, N may be 2. Some guard bands may have a size of zero. When a plurality of numerologies (e.g., a plurality of subcarrier spacings) are configured in a carrier, a subband and/or a guard band may be configured for each subcarrier spacing.

The subband(s) and the guard band(s) may not overlap each other. In addition, a union of the subband(s) and the guard band(s) may coincide with a carrier bandwidth (i.e., all RB(s) constituting a carrier). Alternatively, the union of the subband(s) and the guard band(s) may coincide with a bandwidth of a BWP (i.e., all RB(s) constituting the BWP). A start RB of a first subband (e.g., a subband in the lowest frequency position) may coincide with a start RB of the carrier (or BWP), and an end RB of a last subband (e.g., a subband in the highest frequency position) may coincide with an end RB of the carrier (or BWP). In this case, information on the start RB of the first subband and the end RB of the last subband may be excluded from the above-described configuration information. In addition, a guard band may not be disposed at the beginning part and the ending part of the carrier (or BWP). That is, the start RB and the end RB of the carrier (or BWP) may each be included in a subband other than the guard band.

Alternatively, one or more (e.g., one) guard band(s) may be configured to the terminal. Alternatively, no guard band may be configured to the terminal. Even in this case, the above-described relationship between the subband(s) and the guard band(s) may be identically established. According to the above-described relationship, the terminal may determine N subband(s) from (N−1) guard band(s). In an exemplary embodiment, N may be 1. That is, no guard band may be configured to the terminal. In this case, the terminal may determine one subband, and one subband may occupy the entire band of the carrier or BWP.

Referring again to FIG. 7, the first subband and the second subband may be configured to the first terminal and the second terminal, and the first terminal and the second terminal may determine the position of the first guard band based on the configuration of the first subband and the second subband. For example, configuration information of the first subband and the second subband may include information on an end RB of the first subband and information on a start RB of the second subband. For another example, the first subband and the second subband may correspond to a downlink BWP and an uplink BWP, respectively, and configuration information of the first subband and the second subband may include or may correspond to a BWP configuration information. Configuration information of the first guard band may be delivered to the first terminal and the second terminal as a part of the BWP configuration information or as a separate message. The configuration information of the first guard band may include information on the start RB and the end RB of the first guard band or information on the start RB and the number of RBs of the first guard band. Alternatively, a location of the first guard band may be determined based on a location of one of the first subband and the second subband (e.g., the second subband). In this case, the configuration information of the first guard band may not include information on the location of the first guard band but include information on the number of RBs of the first guard band.

Alternatively, the first guard band may be configured to the first terminal and the second terminal, and the first and second terminals may determine the positions of the first subband and the second subband based on the configuration of the first guard band. For example, the configuration information of the first guard band may include information on the start RB and the end RB of the first guard band or information on the start RB and the number of RBs of the first guard band. In an exemplary embodiment, N may be 2. The second downlink region including the first subband (or corresponding to the first subband) within the second period and the first downlink region including the second subband (or corresponding to the second subband) within the second period may be configured to terminals. Alternatively, the terminal may receive configuration information of the transmission direction (e.g., downlink) of the first subband within the second period and the transmission direction (e.g., uplink) of the second subband within the second period, and may determine the first subband and the second subband as a downlink region and an uplink region based on the configuration information (e.g., transmission directions), respectively.

The terminal may not perform a signal transmission operation in the guard band or at least partial time period of the guard band. The terminal may not perform a signal reception operation in the guard band or at least partial time period of the guard band. The terminal may apply a bandpass filter (e.g., radio frequency (RF) filter, digital filter, etc.) to a signal transmitted in each subband based on a bandwidth of the guard band and/or subband. Accordingly, the magnitude of the interference that the transmission signal exerts on adjacent subbands (e.g., adjacent subbands having different transmission directions) may be small. The terminal may apply a bandpass filter to a signal received in each subband based on the bandwidth of the guard band and/or subband, and may process the filtered downlink signal Referring again to FIG. 3, the first terminal may receive a downlink signal in the first subband, and the second terminal may transmit an uplink signal in the second subband adjacent to the first subband at the same time point as when the downlink signal is received. A frequency region between the first subband and the second subband may be configured as a guard band for the second terminal, and the second terminal may not transmit a signal in the guard band. The second terminal may apply a bandpass filter to the uplink signal according to the second subband and the guard band, and may transmit the filtered uplink signal. Accordingly, the magnitude of the interference of the filtered uplink signal on the downlink signal received by the first terminal in the first subband may be small. That is, the above-described cross-link interference problem between terminals may be alleviated. Accordingly, the first terminal may perform a reception operation from the base station without considering cross-link interference caused by other communication nodes other than the base station.

The subband(s) and/or guard band(s) configured to the terminal may be temporally changed. For example, subband(s) and/or guard band(s) may be configured to the terminal for each specific time period, and the above-described configuration may be periodically repeated. Alternatively, the subband(s) and/or guard band(s) configured to the terminal may not be temporally changed. That is, the configuration of the subband(s) and/or the guard band(s) may be equally applied to all time periods until reconfiguration. According to the third exemplary embodiment of FIG. 7, the first subband, the second subband, and/or the guard band configured for the first terminal and the second terminal may be applied commonly to all periods including the first period, the second period, and the third period.

The above-described operations of the terminal with respect to the guard band may be performed only in a partial time period of the guard band. That is, the above-described operations may be valid only in a partial time period of the guard band. For each guard band, a period in which operations with respect to the guard band is valid may be referred to as a valid period, and a period in which operations with respect to the guard band is not valid may be referred to as an invalid period. That is, the terminal may not perform a signal transmission operation and/or a signal reception operation in the guard band during the valid period of the guard band. On the other hand, the terminal may perform a signal transmission operation and/or a signal reception operation in the guard band during the invalid period of the guard band. In the invalid period, the terminal may not perform the operation of applying a bandpass filter based on the guard band.

When two subbands adjacent to a guard band have different transmission directions in a specific period, the above-described specific period may be a valid period of the guard band. On the other hand, when two subbands adjacent to a guard band have the same transmission direction in a specific period, the above-described specific period may be an invalid period of the guard band. In the invalid period, the guard band may be regarded as a resource region (e.g., a resource region having a specific transmission direction). The specific transmission direction may be downlink, uplink, or flexible, and the transmission direction of the guard band may coincide with the transmission direction of two subbands adjacent to the corresponding guard band.

Referring again to FIG. 7, the first subband, the second subband, and the guard band disposed between the first subband and the second subband, which are configured to terminals, may not change in time. However, the guard band may be valid only in some time periods. For example, since the transmission directions of two subbands adjacent to the guard band (e.g., the first subband and the second subband) are different from each other in the second period, the second period may be a valid period of the guard band.

On the other hand, since the transmission directions of two subbands (e.g., the first subband and the second subband) adjacent to the guard band coincide with each other in the first period and the third period, the first period and the third period may be invalid periods of the guard band. The guard band may be regarded as a resource region having a specific transmission direction in the first period and the third period. For example, since the subbands adjacent to the guard band (e.g., the first subband and the second subband) are configured as downlink regions, the guard band may be regarded as a downlink region in the first period. The downlink region of the guard band and the downlink regions of adjacent subbands may be regarded as one downlink region (e.g., first downlink region) having a continuous frequency range. For another example, since subbands adjacent to the guard band (e.g., the first subband and the second subband) are configured as uplink regions in the third period, the guard band may be regarded as an uplink region in the third period. The uplink region of the guard band and the uplink regions of adjacent subbands may be regarded as one uplink region (e.g., second uplink region) having a continuous frequency range.

When a plurality of guard bands are configured in a carrier or a BWP, the above-described operations may be applied to each guard band. That is, for each guard band, whether a guard band is a valid period and/or a transmission direction when the guard band is an invalid period may be determined by transmission directions of two subbands adjacent to the guard band (or resource regions configured in the two adjacent subbands).

The above-described configuration information of the full-duplex resource region may be transmitted from the base station to the terminal based on a signaling procedure (e.g., RRC signaling, MAC CE signaling, DCI, etc.). In some exemplary embodiments described above, the configuration information may include the above-described slot format configuration (or indication) information. Alternatively, the configuration information may be included in the slot format configuration (or indication) information. A resource region for full-duplex communication may be independently configured for each terminal. For example, the configuration information may be transmitted to the terminal through UE-specific RRC signaling. In exemplary embodiments, 'configuration' may refer to semi-static configuration or dynamic indication.

In exemplary embodiments, a default transmission direction may be defined for a resource region or subband. When information on a transmission direction for a certain resource region is not received, the terminal may assume that the transmission direction for the corresponding resource region is the default transmission direction. The default transmission direction may be predefined in a technical specification. For example, the default transmission direction may be flexible. For another example, the default transmission direction may be one of downlink and uplink. Alternatively, the default transmission direction may be configured by the base station to the terminal. In this case, information on the default transmission direction may not be included in the above-described configuration information of the full-duplex resource region. That is, the information on the default transmission direction may be included in a separate message transmitted to the terminal.

According to exemplary embodiments, the terminal may receive configuration information of resource region(s) having a downlink or uplink transmission direction. Meanwhile, the terminal may receive configuration information of a flexible region(s) in addition to the downlink region(s) and the uplink region(s). The terminal may perform both uplink transmission and downlink transmission in a flexible region. In addition, the terminal may switch from a downlink operation to an uplink operation in the flexible period (or guard period). In exemplary embodiments below, methods for configuring a resource region in consideration of a flexible region will be described.

Figure 9A:
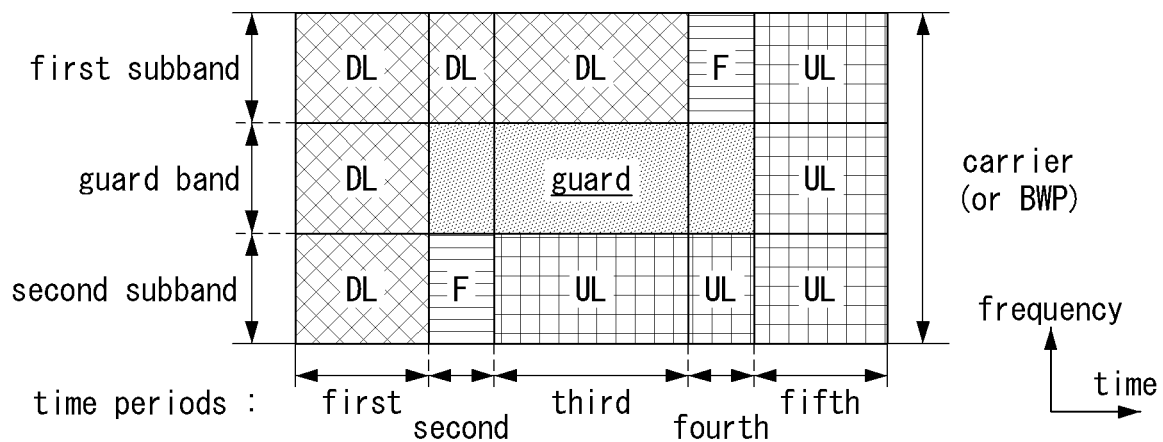
FIG. 9A is a conceptual diagram illustrating a first exemplary embodiment of a method for configuring a full-duplex resource region.
Figure 9B:
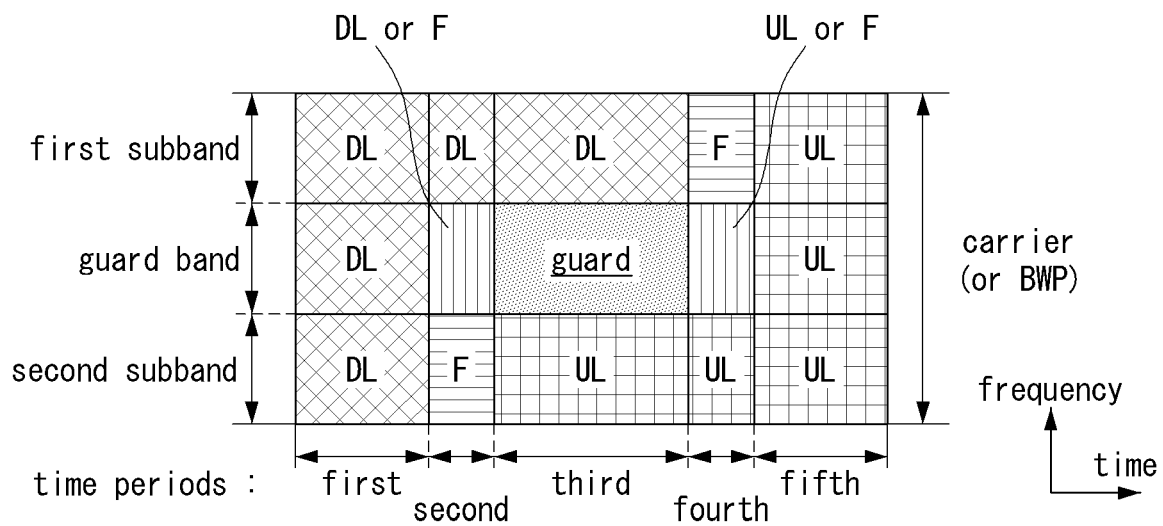
FIG. 9B is a conceptual diagram illustrating a second exemplary embodiment of a method for configuring a full-duplex resource region.

FIG. 9A is a conceptual diagram illustrating a first exemplary embodiment of a method for configuring a full-duplex resource region, and FIG. 9B is a conceptual diagram illustrating a second exemplary embodiment of a method for configuring a full-duplex resource region.

Referring to FIGS. 9A and 9B, a terminal may receive configuration information of resource regions for downlink and uplink transmissions from a base station. Each resource region may be a downlink region, an uplink region, and/or a flexible region. The terminal may receive configuration information of a plurality of subbands (i.e., first subband and second subband) and a guard band by the above-described methods. The subbands and the guard band may be configured for a carrier or BWP.

In exemplary embodiments, one or more resource regions may be configured for each time period, and each resource region may include one or more subbands. For example, in a first period, the first subband and the second subband may be configured as downlink regions, and in the fifth period, the first subband and the second subband may be configured as uplink regions. In the first period and the fifth period, the guard band may be regarded as a resource region having the same transmission direction as that of the first subband and the second subband, and may be used for signal transmission. Also, in the third period, the first subband may be configured as a downlink region, and the second subband may be configured as an uplink region. Since the transmission directions of the first subband and the second subband are different in the third period, the third period may be a valid period of the guard band. The terminal may apply a bandpass filter to an uplink transmission signal and/or a downlink reception signal based on the guard band in the third period, and cross-link interference may be controlled by applying the bandpass filter.

In the second period, the first subband may be configured as a downlink region, and the second subband may be configured as a flexible region. In the fourth period, the first subband may be configured as a flexible region, and the second subband may be configured as an uplink region. When a transmission direction of one subband among two subbands adjacent to the guard band is flexible and a transmission direction of the other subband is uplink or downlink, the corresponding period (e.g., the second period and the fourth period) may be regarded as a valid period of the guard band. Referring to FIG. 9A, the terminal may regard the second and fourth periods as valid periods of the guard band. Alternatively, when a transmission direction of one subband among two subbands adjacent to the guard band is flexible and a transmission direction of the other subband is uplink or downlink, the corresponding guard band may be regarded as a resource region having the same transmission direction (e.g., flexible) as the above-described one subband. Alternatively, in the above-described case, the corresponding guard band may be regarded as a resource region having the same transmission direction (e.g., uplink or downlink) as the other one subband described above. Referring to FIG. 9B, the terminal may regard the guard band as a flexible region in the second and fourth periods. Alternatively, the terminal may regard the guard band as a downlink region in the second period, and may regard the guard band as an uplink region in the fourth period. On the other hand, when the transmission directions of subbands adjacent to the guard band are all flexible in a certain period, the terminal may regard the guard band as an invalid period, and may regard the guard band as a flexible region.

Figure 10A:
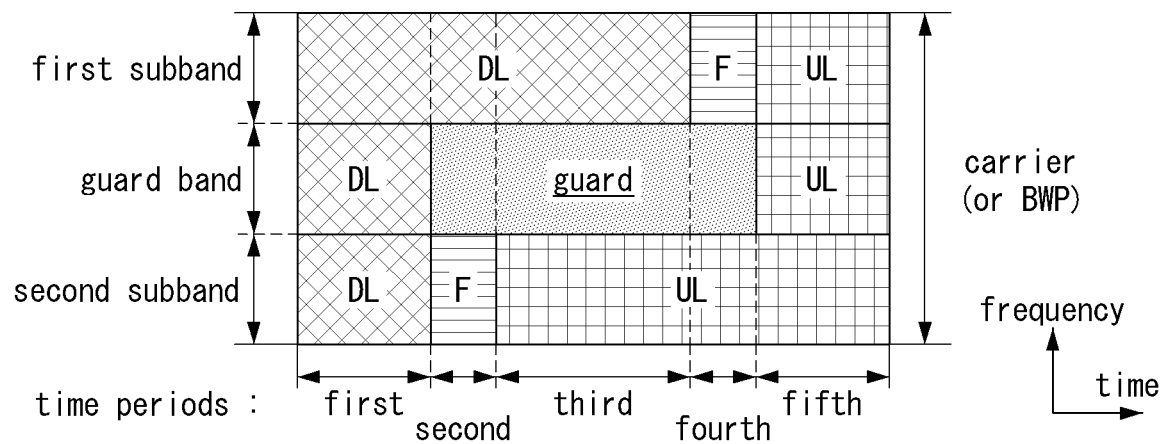
FIG. 10A is a conceptual diagram illustrating a third exemplary embodiment of a method for configuring a full-duplex resource region.
Figure 10B:
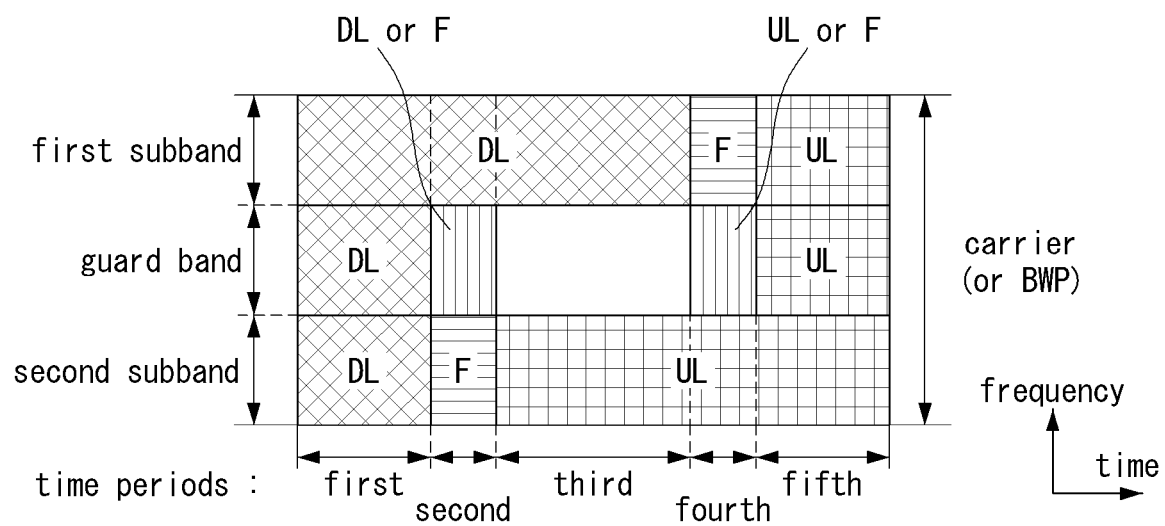
FIG. 10B is a conceptual diagram illustrating a fourth exemplary embodiment of a method for configuring a full-duplex resource region.

FIG. 10A is a conceptual diagram illustrating a third exemplary embodiment of a method for configuring a full-duplex resource region, and FIG. 10B is a conceptual diagram illustrating a fourth exemplary embodiment of a method for configuring a full-duplex resource region.

Referring to FIGS. 10A and 10B, a terminal may receive configuration information of resource regions for downlink and uplink transmissions from a base station. Each resource region may be a downlink region, an uplink region, and/or a flexible region. The terminal may receive configuration information of a plurality of subbands (i.e., first subband and second subband) and a guard band by the above-described methods.

In exemplary embodiments below, a resource region (or time period) may be configured for each subband (or for each set of subband(s)). A downlink period, an uplink period, and/or a flexible period may be configured to the terminal for each subband (or for each set of subband(s)). The above-described configuration may be individually performed for each subband (or a set of subband(s)). Referring to FIGS. 10A and 10B, the first to third periods in the first subband may be configured to the terminal as downlink periods, the fourth period in the first subband may be configured to the terminal as a flexible period, and the fifth period in the first subband may be configured to the terminal as an uplink period. The first period in the second subband may be configured to the terminal as a downlink period, the second period in the second subband may be configured to the terminal as a flexible period, and the third to fifth periods in the second subband may be configured to the terminal as uplink periods. According to the above-described method, the terminal may regard the guard band as a downlink region in the first period, and may regard the guard band as an uplink region in the fifth period. In addition, the terminal may regard the guard band as valid in the third period. Referring to FIG. 10A, the terminal may regard the guard band as valid in the second period and the fourth period. Referring to FIG. 10B, the terminal may regard the guard band as a flexible region in the second and fourth periods. Alternatively, the terminal may regard the guard band as a downlink region in the second period, and may regard the guard band as an uplink region in the fourth period.

According to exemplary embodiments, configuration of subband(s) and/or guard band(s) may be commonly applied to downlink and uplink. For example, the same subband(s) and/or guard band(s) may be used for configuration of a downlink region(s) and configuration of an uplink region(s). Alternatively, subband(s) and/or guard band(s) may be configured for downlink and uplink, respectively. For example, subband(s) and/or guard band(s) for downlink may be used in configuration of downlink region(s), and subband(s) and/or guard band(s) for uplink may be used in configuration of uplink region(s). In an uplink transmission procedure, the terminal may perform a filtering (e.g., bandpass filtering) operation based on subband(s) and/or guard band(s) configured for uplink. In a downlink reception procedure, the terminal may perform a filtering (e.g., bandpass filtering) operation based on subband(s) and/or guard band(s) configured for downlink.

[Methods for Signal Transmission in a Full-duplex Period]

According to exemplary embodiments, both an uplink region and a downlink region may be configured to the terminal in the same time period within one carrier or BWP. Alternatively, a flexible region and one of an uplink region and a downlink region may be configured to the terminal in the same time period. A period (or resource region) in which both uplink transmission and downlink transmission are possible or a period (or resource region) in which both uplink transmission and downlink transmission are configured to be possible may be referred to as a 'full-duplex period'.

The base station may simultaneously perform an uplink reception operation and a downlink transmission operation in the full-duplex period. The terminal may simultaneously perform an uplink transmission operation and a downlink reception operation in the full-duplex period. The corresponding terminal may be a terminal having self-interference cancellation capability. Alternatively, the terminal may not perform a uplink transmission operation and a downlink reception operation at the same time (or in the same time period) in the full-duplex period. The corresponding terminal may be a terminal having no self-interference cancellation capability. Here, the downlink reception operation may include a measurement operation (e.g., radio resource management (RRM) measurement, CSI measurement, and beam quality measurement) based on reception of a downlink signal.

Hereinafter, transmission methods for a terminal that does not simultaneously perform a transmission operation and a reception operation will be described. In a first method, a period indicated (or configured) for the terminal to perform an uplink transmission operation (e.g., duration of an uplink signal) and a period indicated (or configured) for the terminal to perform a downlink reception operation (e.g., duration of a downlink signal) may not overlap in time. The terminal may not expect that the above-described periods are configured to overlap. Accordingly, the terminal may perform only one of the transmission operation and the reception operation at one time. The above-described operation may be applied to an arbitrary time period including a full-duplex period. The method described above may be referred to as (Method 200).

Figure 11:
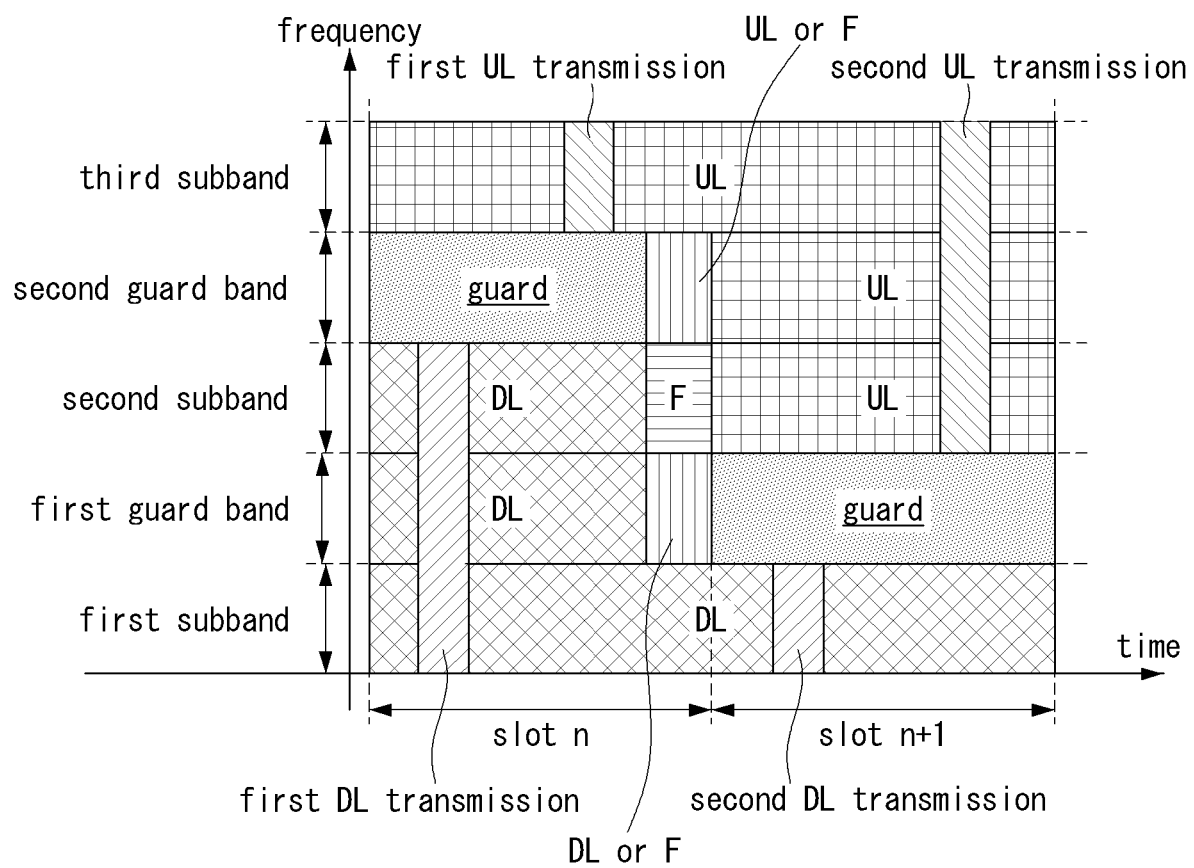
FIG. 11 is a conceptual diagram illustrating a first exemplary embodiment of a method for transmitting a signal in a full-duplex period.

FIG. 11 is a conceptual diagram illustrating a first exemplary embodiment of a method for transmitting a signal in a full-duplex period.

Referring to FIG. 11, a terminal may receive configuration information of a plurality of subbands (e.g., first, second, and third subbands) and/or a plurality of guard bands (e.g., first and second guard bands). Downlink region(s), uplink region(s), and/or flexible region(s) may be configured to the terminal based on the above-described configuration information. In this case, according to (Method 120), the terminal may receive configuration information of resource regions having different transmission directions in the same period. For example, a downlink region may be configured to the terminal in the first subband of a slot n, a downlink region and a flexible region may be configured to the terminal in the second subband of the slot n, and an uplink region may be configured to the terminal in the third subband of the slot n. In the slot n, a part of the first guard band may be regarded as a downlink region, and the remaining part of the first guard band may be regarded as a downlink region or a flexible region. In the slot n, a part of the second guard band may be regarded as a valid guard band, and the remaining part of the second guard band may be regarded as an uplink region or a flexible region. The slot n may be regarded as a full-duplex period. Identically or similarly to the slot n, the slot n+1 may be regarded as a full-duplex period.

According to (Method 200), uplink transmission and downlink transmission may not overlap in time in the full-duplex period. In this case, the uplink transmission and the downlink transmission may be TDMed in units of symbols. That is, the terminal may not receive scheduling information or configuration information for both uplink transmission and downlink transmission in the same symbol. Referring to FIG. 11, the terminal may receive scheduling information for a first downlink transmission in a partial period (e.g., symbol(s)) of the slot n, and may receive scheduling information for a first uplink transmission in another partial period (e.g., other symbol(s)) of the slot n. The first downlink transmission and the first uplink transmission may not overlap each other in the time domain. Identically or similarly to the above-described exemplary embodiment, the terminal may receive scheduling information for a second downlink transmission in a partial period (e.g., symbol(s)) of the slot n+1, and may receive scheduling information for a second uplink transmission in another partial period (e.g., other symbol(s)) of the slot n+1. The terminal may perform both downlink transmission and uplink transmission in the slot n and the slot n+1, which are full-duplex periods.

Alternatively, the uplink transmission and the downlink transmission may be TDMed in units of slots. That is, the terminal may not receive scheduling information or configuration information for both uplink transmission and downlink transmission in the same slot. According to the above-described method, the terminal may receive scheduling information for one of a first downlink transmission and a first uplink transmission in the slot n. The terminal may receive scheduling information for one of a second downlink transmission and a second uplink transmission in the slot n+1. The terminal may perform either one of downlink transmission and uplink transmission in each of the slot n and the slot n+1, which are full-duplex periods.

Referring to FIG. 11, the first downlink transmission may be performed in a frequency region including the first guard band. That is, the terminal may receive a downlink signal in a partial period of the guard band (e.g., the slot n of the first guard band). The second uplink transmission may be performed in a frequency region including the second guard band. That is, the terminal may transmit an uplink signal in a partial period of the guard band (e.g., the slot n+1 of the second guard band).

As a method different from (Method 200), a period indicated (or configured) for the terminal to perform an uplink transmission operation (e.g., duration of an uplink signal) and a period indicated (or configured) for the terminal to perform a downlink reception operation (e.g., duration of a downlink signal) may be allowed to overlap in time. The method described above may be referred to as (Method 210). (Method 210) may be applied to a full-duplex period. Alternatively, (Method 210) may be applied to a time period other than a full-duplex period.

Figure 12:
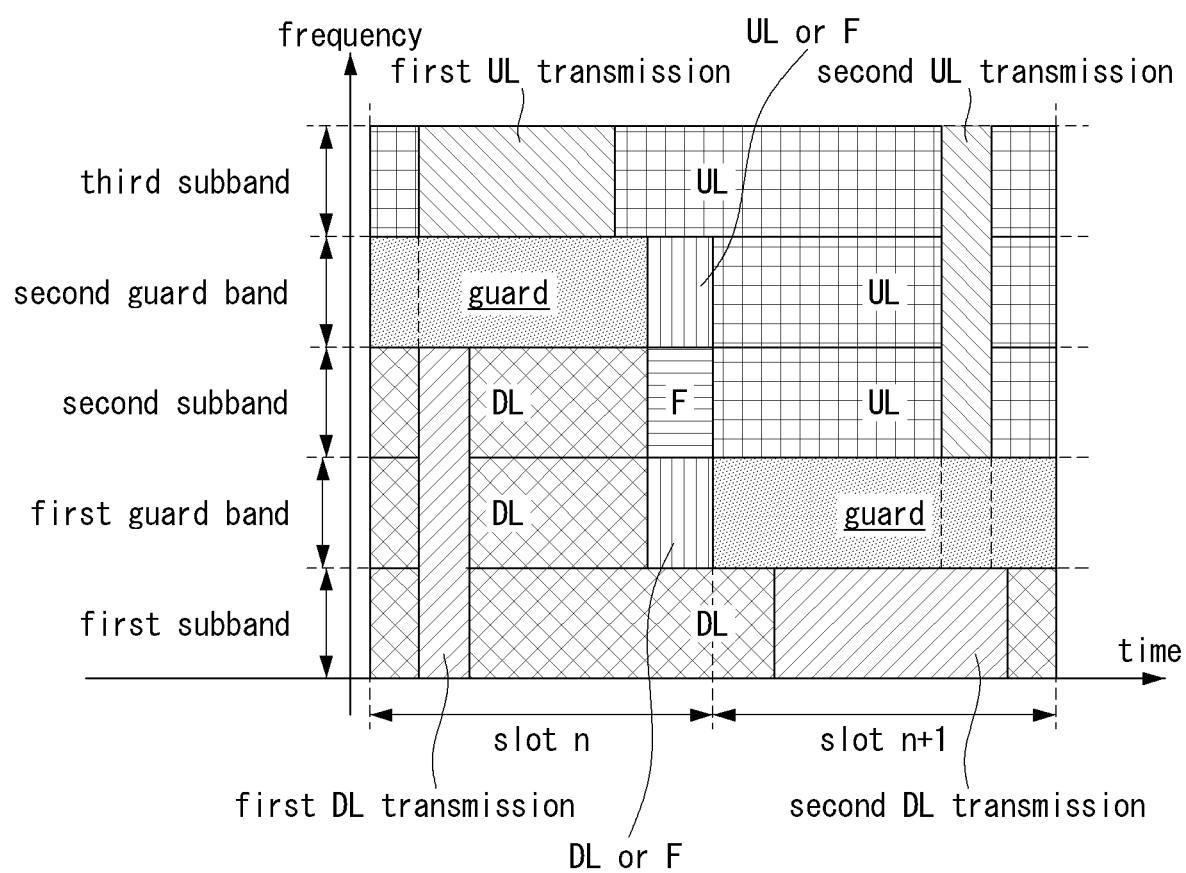
FIG. 12 is a conceptual diagram illustrating a second exemplary embodiment of a method for transmitting a signal in a full-duplex period.

FIG. 12 is a conceptual diagram illustrating a second exemplary embodiment of a method for transmitting a signal in a full-duplex period.

Referring to FIG. 12, a terminal may receive configuration information of a plurality of subbands (e.g., first, second, and third subbands) and/or a plurality of guard bands (e.g., first and second guard bands). Downlink region(s), uplink region(s), and/or flexible region(s) may be configured to the terminal based on the above-described configuration information. Specific resource region configuration in FIG. 12 may be the same as or similar to that of the first exemplary embodiment of FIG. 11.

According to (Method 210), uplink transmission and downlink transmission may overlap in time in a full-duplex period. For example, the terminal may receive scheduling information for a first downlink transmission and a first uplink transmission in a slot n, and the first downlink transmission and the first uplink transmission may overlap in time (e.g., may be scheduled in the same symbol(s)). In this case, the terminal may select one of the overlapping downlink transmission and uplink transmission, and may perform the selected transmission. The terminal may not perform unselected transmission. For example, the first downlink transmission may be a CSI-RS transmission, and the first uplink transmission may be an SRS transmission. The terminal may transmit SRS or receive CSI-RS, and may not transmit or receive the other. Alternatively, the terminal may transmit and receive both at least a part of the downlink transmission and at least a part of the uplink transmission. In this case, at least the part of downlink transmission and at least the part of uplink transmission may not overlap in time. For example, the terminal may receive the CSI-RS in all symbol(s) to which the first downlink transmission is allocated, and may transmit the SRS in symbol(s) not overlapping the first downlink transmission among symbol(s) to which the second uplink transmission is allocated. That is, when the uplink transmission is SRS transmission, the uplink transmission may be performed only in some symbol(s) due to the overlapping with the downlink transmission.

In addition, the terminal may receive scheduling information for a second downlink transmission and a second uplink transmission in the slot n+1, and the second downlink transmission and the second uplink transmission are may overlap in time (e.g., may be scheduled in the same symbol(s)). For example, the second downlink transmission may be a PDSCH transmission, and the second uplink transmission may be a PUSCH transmission. The terminal may transmit or receive one of the second downlink transmission and the second uplink transmission, and may not transmit or receive the other one.

Whether the downlink transmission and the uplink transmission overlap or not may be determined in units of symbols. Alternatively, it may be determined in units of slots. In this case, when both the uplink transmission and the downlink transmission are allocated in the same slot, even if the uplink transmission and the downlink transmission do not overlap in the same symbol, the terminal may perform one of the transmissions or at least a part of the respective transmissions according to the above-described method.

A criteria and/or rule for the terminal to select one transmission among the uplink transmission and the downlink transmission overlapping with each other and/or a criteria and/or rule for the terminal to give a higher priority to one transmission among the uplink transmission and the downlink transmission overlapping with each other may be predefined in technical specifications. Alternatively, the terminal may select one transmission, or may give a higher priority to one transmission based on signaling from the base station.

The prioritization rule between uplink transmission and downlink transmission applied to a full-duplex period may be the same as the prioritization rule between uplink transmission and downlink transmission applied to a flexible period (or flexible symbol(s)). Alternatively, the prioritization rule between uplink transmission and downlink transmission applied to a full-duplex period may be the same as the prioritization rule between uplink transmission and downlink transmission applied when the terminal does not receive slot format configuration information (e.g., semi-static slot format configuration by RRC signaling) from the base station.

Although the single carrier operations have been mainly considered in the exemplary embodiments, the above-described methods may be identically or similarly applied even when the terminal transmits a signal using a plurality of carriers (or a plurality of BWPs). For example, a first carrier and a second carrier may be configured to the terminal. The terminal may receive configuration information of resource region(s) for full-duplex communication in the carriers based on the above-described methods. For example, a downlink region and an uplink region may be respectively configured in the first carrier (or a subband configured in the first carrier) and the second carrier (or a subband configured in the second carrier) in a certain time period. The downlink region and the uplink region may overlap in time. In this case, the period may be regarded as a full-duplex period. The terminal may perform transmission/reception operations based on the above-described methods in the full-duplex period.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, comprising:
receiving, from a base station, configuration information of a guard band configured within a carrier bandwidth;
determining a first transmission direction of a first subband configured in a higher frequency region from the guard band within the carrier bandwidth;
determining a second transmission direction of a second subband configured in a lower frequency region from the guard band within the carrier bandwidth;
determining a third transmission direction of the guard band based on the first transmission direction and the second transmission direction; and
performing communication with the base station according to the third transmission direction in the guard band,
wherein the first transmission direction, the second transmission direction, and the third transmission direction are applied to a first time period, and a fourth transmission direction of the first subband and a fifth transmission direction of the second subband are configured in a second time period different from the first time period.

2. The method according to claim 1, wherein each of the first transmission direction, the second transmission direction, and the third transmission direction is downlink, uplink, or flexible, and the guard band is regarded as a transmission resource used for the communication in the first time period based on the first transmission direction and the second transmission direction.

3. The method according to claim 1, wherein when both the first transmission direction and the second transmission direction are downlink, the third transmission direction is determined to be downlink, and the communication is downlink communication.

4. The method according to claim 1, wherein when both the first transmission direction and the second transmission direction are uplink, the third transmission direction is determined to be uplink, and the communication is uplink communication.

5. The method according to claim 1, wherein when the first transmission direction is flexible, the third transmission direction is determined to be same as the second transmission direction, and the communication is performed with a same transmission direction in the second subband and the guard band.

6. The method according to claim 1, wherein the first transmission direction and the second transmission direction are determined based on information included in a message received from the base station.

7. The method according to claim 1, wherein each of the guard band, the first subband, and the second subband includes one or more continuous resource blocks (RBs).

8. The method according to claim 1, wherein the guard band is regarded as a resource not used for the communication in the second time period based on the fourth transmission direction and the fifth transmission direction.

9. The method according to claim 8, wherein the fourth transmission direction is uplink, and the fifth transmission direction is downlink.

10. The method according to claim 8, wherein the fourth transmission direction is flexible, and the fifth transmission direction is one of downlink and uplink.

11. A method of a base station, comprising:
transmitting, to a terminal, configuration information of a guard band configured within a carrier bandwidth;
determining a first transmission direction of a first subband configured in an upper frequency region from the guard band within the carrier bandwidth;
determining a second transmission direction of a second subband configured in a lower frequency region from the guard band within the carrier bandwidth;
determining a third transmission direction of the guard band based on the first transmission direction and the second transmission direction; and
performing communication with the terminal according to the third transmission direction in the guard band,
wherein the first transmission direction, the second transmission direction, and the third transmission direction are applied to a first time period, and a fourth transmission direction of the first subband and a fifth transmission direction of the second subband are configured in a second time period different from the first time period.

12. The method according to claim 11, wherein each of the first transmission direction, the second transmission direction, and the third transmission direction is downlink, uplink, or flexible, and the guard band is regarded as a transmission resource used for the communication in the first time period based on the first transmission direction and the second transmission direction.

13. The method according to claim 11, wherein when both the first transmission direction and the second transmission direction are downlink, the third transmission direction is determined to be downlink, and the communication is downlink communication.

14. The method according to claim 11, wherein when both the first transmission direction and the second transmission direction are uplink, the third transmission direction is determined to be uplink, and the communication is uplink communication.

15. The method according to claim 11, wherein when the first transmission direction is flexible, the third transmission direction is determined to be same as the second transmission direction, and the communication is performed with a same transmission direction in the second subband and the guard band.

16. The method according to claim 11, further comprising transmitting, to the terminal, a message including information for determining the first transmission direction and the second transmission direction, wherein the first transmission direction and the second transmission direction are determined based on the information included in the message.

17. The method according to claim 11, wherein each of the guard band, the first subband, and the second subband includes one or more continuous resource blocks (RBs).

18. The method according to claim 11, wherein the guard band is regarded as a resource not used for the communication in the second time period based on the fourth transmission direction and the fifth transmission direction.

19. The method according to claim 18, wherein the fourth transmission direction is uplink, and the fifth transmission direction is downlink.

20. The method according to claim 18, wherein the fourth transmission direction is flexible, and the fifth transmission direction is one of downlink and uplink.

* * * * *